A. LOEHNER.
Car Coupling.
No. 232,195. Patented Sept. 14, 1880.
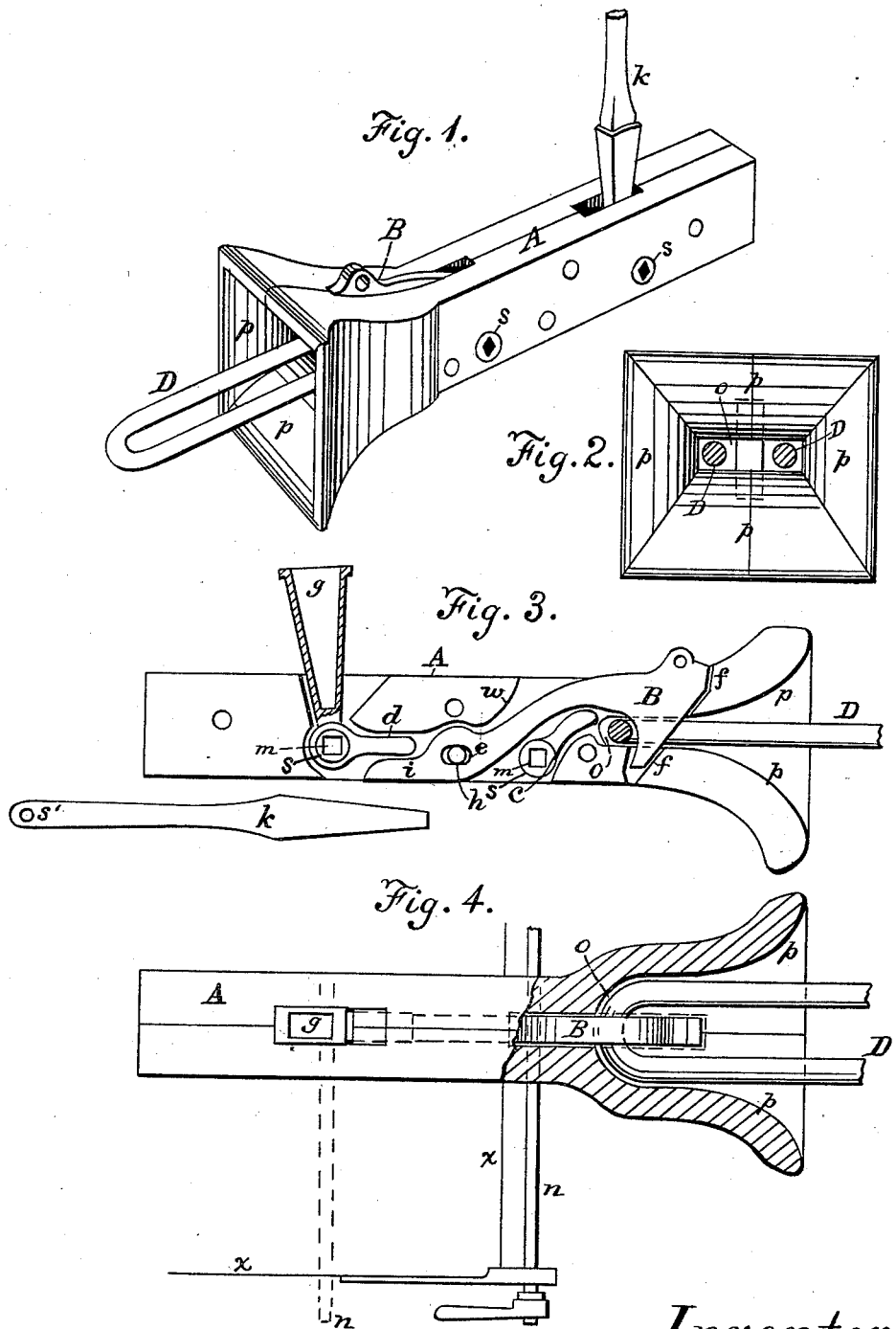

UNITED STATES PATENT OFFICE.

AUGUSTE LOEHNER, OF ST. LOUIS, MISSOURI, ASSIGNOR OF ONE-HALF OF HIS RIGHT TO BRITTON A. HILL, OF SAME PLACE.

CAR-COUPLING.

SPECIFICATION forming part of Letters Patent No. 232,195, dated September 14, 1880.

Application filed February 10, 1880.

*To all whom it may concern:*

Be it known that I, AUGUSTE LOEHNER, of the city of St. Louis, in the county of St. Louis and State of Missouri, have invented a new and useful Improvement in Car-Couplings for Railroad-Cars of all Descriptions, of which the following is a specification, reference being had to the accompanying drawings, and to the letters of reference marked thereon.

The object of my invention is to provide a coupling for cars, whereby the cars may be instantaneously coupled or uncoupled at will without any risk or danger to life or limb, and in case the cars leave the track or become overturned they become uncoupled automatically and instantaneously without the agency of any one to operate the coupling device.

In the accompanying drawings, forming a part of this specification, Figure 1 represents a perspective view of a car-coupling having my improvements. Fig. 2 is a front view of the same. Fig. 3 is a longitudinal division, one part being removed to show the interior. Fig. 4 is a plan view, partly in section.

In the drawings referred to, A designates the coupling-shell, which is made in two parts, the same being recessed and formed to receive the coupling-hook B, the thumb-lever $c$, and the pocket-lever $d$, and to allow the several movements of said hook and levers respectively. The draw-bar or body of the coupling is thus made by a vertical longitudinal direction along the center in two parts to be fastened together by bolts, each part being recessed, as shown, sufficiently to receive the coupling-hook, the thumb-lever, and pocket-lever, respectively, and to close about said levers and hook, but allow their respective movements.

The line of indentation $f$ of the shell A, being the forward limit of the recess for the hook B, forms a seat for the head of the hook to rest against when closed. $e$ is an aperture in the hook B, through which a bolt, $h$, passes to hold the hook in position, and forms a fulcrum, on which it turns. The seat $f$ conforms, as shown, to the head of the hook B, and the aperture $e$ is somewhat elongated longitudinally, as seen in Fig. 3, to allow the hook to be drawn by the coupling-link D against $f$, so that when the cars are going there is no strain on the bolt $h$, or any other part of the hook, the only strain being on the strong part or head of the hook.

The thumb-lever $c$ is placed under the hook B, (see Fig. 3,) and by a movement of said lever the hook is raised and the coupling-link D is released. The lever $d$, which is provided with a pocket, $g$, is placed at the rear of the coupling-hook B, and extends over an arm, $i$, at the back end of said hook, so that by a movement of said lever against the arm $i$ the hook is lifted and the uncoupling is effected. The pocket $g$ is intended to receive the end of a drop-bar, $k$, which may be used in operating lever $d$, said bar being passed down from above.

The levers $c$ and $d$ are provided with trunnions $s$, with bearings in holes in the two parts of the body of the coupling, and the square apertures $m$ are made entirely through the levers and trunnions. The square holes $m$ through levers $c$ and $d$ are provided for the purpose of inserting square bars $n$, as shown in Fig. 4, said bars running to the outside of the car, where at any time, when necessary, a wrench may be applied to either bar to uncouple the cars.

$x$ indicates the outer line of a car.

By the construction of the recess within the coupling-shell the hook B is prevented, by the shoulder or stop formed at $w$, from being lifted farther than is necessary to liberate the coupling-link, and thereby the hook is secured from being bent or broken.

The mouth-piece of the coupling-shell is formed expanding to the front. The curved inner surfaces are indicated by $p$, the space within these surfaces being reduced to the rear, so as to receive the link D from another car and guide it to the seat $o$ formed in the rear, so that the hook B may pass through the link when the latter is in position in its seat.

Thus, as will be seen, the seat $o$ conforms to the end of a link, D, and forms a socket for the same, so that it not only holds the link in a horizontal position, but also prevents its moving farther back than the seat $o$ and pushing the hook upward, to save the hook from damage, that it should not be pressed upward more than is necessary.

The operation of the coupling is as follows:
The link D being secured in the draw-head of one car moving to another car, either of the two cars might stand higher or lower than the other, or said cars might stand on a curve in the track, yet by the construction of the mouth-piece, as shown, the link D is so supported in its resting-place in a line nearly horizontal with the platform of the car that it will strike one or the other side of the mouth-piece, and will be guided toward the hook B, which rests in its seat $f\ f$, and coming in contact with said hook, the same being inclined backward, as shown, will lift the hook, and the link passing the point of the hook, the latter from its own weight drops into position, and the coupling of cars is thus effected.

For uncoupling the cars either the pocket-lever $d$ or the lever $c$ may be used by means of a bar, $n$, or in case of the pocket-lever by means of drop-bar $k$. A chain or cord may be attached to the drop-bar at the hole $s'$ when used for box-cars. The pocket-lever is adapted for passenger-cars, and will move under the platform of said cars, an opening made in the platform to be closed by a small trap-door allowing access to the pocket $g$, into which the lever will be dropped or inserted, and by a forward movement of the lever the hook B will be lifted and the cars at once uncoupled.

The hook B is so constructed and secured loosely within the coupling-shell that in case of cars being overturned or falling on one side the coupling-hook B will fall out or pass from the link and the cars become uncoupled without injuring the hook.

Having described my invention, I claim and desire to secure by Letters Patent—

1. In a car-coupling, the thumb-lever $c$ and pocket-lever $d$ to operate the coupling-hook, as stated, each of said levers being provided with trunnions $s$, with bearings in the body of the coupling, the square apertures $m$ passing through the trunnions to receive bars $n$, as herein specified.

2. The coupling-hook B, pivoted within the recessed body of the coupling, as shown, and provided with an arm, $i$, over which extends the pivoted lever $d$, which is provided with a pocket, $g$, extending upward to receive the end of a bar to actuate the lever, as herein shown and described.

3. In a car-coupling, a pivoted lever, $d$, to operate the coupling-hook, said lever being provided with a pocket, $g$, extending upward to receive the end of a bar used to operate the lever, as set forth.

4. The body of the coupling, made in two parts, recessed, as shown, and the interior being provided with the shoulder or stop $w$, to prevent the coupling-hook from being lifted or swung more than necessary to release the link D, as herein specified.

AUGUSTE LOEHNER.

Witnesses:
BRITTON A. HILL,
JOHN O'CONNOR.